US008524341B2

(12) United States Patent
Emad et al.

(10) Patent No.: US 8,524,341 B2
(45) Date of Patent: *Sep. 3, 2013

(54) ALLOY COMPOSITION USEFUL FOR FLUID TRANSPORT OBJECTS

(75) Inventors: Mehdi Emad, Collegeville, PA (US);
Franck Bertoux, Wayne, PA (US);
Thibaut Montanari, Menneval (FR)

(73) Assignee: Arkema Inc., King of Prussia, PA (US)

( * ) Notice: Subject to any disclaimer, the term of this patent is extended or adjusted under 35 U.S.C. 154(b) by 806 days.

This patent is subject to a terminal disclaimer.

(21) Appl. No.: 11/720,099

(22) PCT Filed: Nov. 23, 2005

(86) PCT No.: PCT/US2005/042807
§ 371 (c)(1),
(2), (4) Date: May 21, 2008

(87) PCT Pub. No.: WO2006/060285
PCT Pub. Date: Jun. 8, 2006

(65) Prior Publication Data
US 2009/0068386 A1 Mar. 12, 2009

Related U.S. Application Data

(60) Provisional application No. 60/631,934, filed on Nov. 30, 2004.

(51) Int. Cl.
*B29D 22/00* (2006.01)
*B29D 23/00* (2006.01)
*B32B 1/08* (2006.01)
*B32B 27/08* (2006.01)
*F16L 11/04* (2006.01)
*C08F 8/30* (2006.01)
*C08L 77/00* (2006.01)

(52) U.S. Cl.
USPC .................. 428/35.7; 428/36.91; 525/179

(58) Field of Classification Search
USPC .............. 525/419, 420, 179; 428/35.7, 36.91
See application file for complete search history.

(56) References Cited

U.S. PATENT DOCUMENTS

| | | | | |
|---|---|---|---|---|
| 4,251,424 A * | 2/1981 | Pagilagan | | 524/169 |
| 4,305,865 A | 12/1981 | Okada et al. | | |
| 4,977,216 A * | 12/1990 | Elia | | 525/183 |
| 4,990,567 A | 2/1991 | Isegawa et al. | | |
| 5,304,596 A | 4/1994 | Moriya et al. | | |
| 5,409,991 A * | 4/1995 | Mitsuno et al. | | 525/66 |
| 5,436,297 A | 7/1995 | Teraya et al. | | |
| 5,569,711 A * | 10/1996 | Yamamoto et al. | | 525/66 |
| 5,585,433 A * | 12/1996 | Yamamoto et al. | | 525/66 |
| 5,710,212 A | 1/1998 | Asano et al. | | |
| 5,814,384 A * | 9/1998 | Akkapeddi et al. | | 428/35.7 |
| 6,075,116 A * | 6/2000 | Moriwaki et al. | | 528/310 |
| 6,302,153 B1 * | 10/2001 | Merziger | | 138/137 |
| 6,368,723 B1 * | 4/2002 | Bouilloux et al. | | 428/476.1 |
| 6,376,037 B1 * | 4/2002 | Montanari et al. | | 428/36.9 |
| 6,467,508 B1 * | 10/2002 | Emad et al. | | 138/137 |
| 6,468,258 B1 * | 10/2002 | Shang | | 604/408 |
| 6,528,587 B2 * | 3/2003 | Robert et al. | | 525/191 |
| 6,610,783 B2 * | 8/2003 | Delius et al. | | 525/66 |
| 6,749,912 B2 * | 6/2004 | Delius et al. | | 428/35.7 |
| 7,029,735 B2 * | 4/2006 | Flat et al. | | 428/35.7 |
| 7,122,233 B2 * | 10/2006 | Montanari et al. | | 428/35.7 |
| 7,235,604 B2 * | 6/2007 | Blondel et al. | | 525/140 |
| 7,750,110 B2 | 7/2010 | Blondel et al. | | |
| 7,862,872 B2 * | 1/2011 | Baumert et al. | | 428/36.91 |
| 8,293,372 B2 | 10/2012 | Blondel et al. | | |
| 2002/0051891 A1 * | 5/2002 | Le Roy et al. | | 428/475.8 |
| 2002/0128386 A1 * | 9/2002 | Montanari et al. | | 525/66 |
| 2002/0173596 A1 * | 11/2002 | Montanari et al. | | 525/432 |
| 2002/0179888 A1 * | 12/2002 | Montanari et al. | | 252/500 |
| 2003/0106602 A1 * | 6/2003 | Hsieh et al. | | 138/137 |
| 2003/0124288 A1 * | 7/2003 | Merziger et al. | | 428/36.91 |
| 2003/0124289 A1 * | 7/2003 | Yamamoto et al. | | 428/36.91 |
| 2003/0165699 A1 * | 9/2003 | Lacroix | | 428/474.9 |
| 2003/0170473 A1 * | 9/2003 | Lacroix | | 428/474.9 |
| 2003/0199635 A1 * | 10/2003 | Court et al. | | 525/178 |
| 2004/0005389 A1 * | 1/2004 | Reighard et al. | | 426/106 |
| 2004/0028921 A1 * | 2/2004 | Amouroux | | 428/459 |
| 2004/0054054 A1 * | 3/2004 | Blondel et al. | | 524/416 |
| 2004/0059056 A1 * | 3/2004 | Montanari et al. | | 525/66 |
| 2004/0063858 A1 * | 4/2004 | Dalton et al. | | 525/63 |
| 2004/0071913 A1 * | 4/2004 | Bellet | | 428/36.91 |
| 2004/0225066 A1 * | 11/2004 | Flat et al. | | 525/178 |
| 2005/0013955 A1 * | 1/2005 | Merziger et al. | | 428/36.91 |
| 2005/0031818 A1 * | 2/2005 | Micheneau | | 428/36.91 |
| 2005/0058845 A1 * | 3/2005 | Bellet et al. | | 428/476.3 |
| 2005/0089701 A1 * | 4/2005 | Le Roy et al. | | 428/516 |
| 2005/0112312 A1 * | 5/2005 | Baumert et al. | | 428/36.91 |
| 2005/0112390 A1 * | 5/2005 | Lacroix | | 428/474.4 |
| 2005/0131147 A1 * | 6/2005 | Brule | | 525/178 |
| 2005/0165175 A1 * | 7/2005 | Montanari et al. | | 525/419 |
| 2005/0228145 A1 * | 10/2005 | Lacroix et al. | | 525/420 |
| 2006/0014035 A1 * | 1/2006 | Montanari et al. | | 428/474.4 |
| 2008/0182945 A1 * | 7/2008 | Malet et al. | | 525/420 |
| 2008/0234436 A1 * | 9/2008 | Sakamoto et al. | | 525/313 |
| 2008/0241562 A1 * | 10/2008 | Bushelman et al. | | 428/474.9 |
| 2009/0035503 A1 * | 2/2009 | Bertoux et al. | | 428/36.8 |
| 2010/0062201 A1 * | 3/2010 | Emad et al. | | 428/36.91 |

FOREIGN PATENT DOCUMENTS

EP 0458365 11/1991
FR 2812928 7/2001

(Continued)

OTHER PUBLICATIONS

Whiteley et al., Polyolefins, Ullmann's Encyclopedia of Industrial Chemistry, 2000.*

*Primary Examiner* — Liam Heincer
(74) *Attorney, Agent, or Firm* — Thomas F. Roland

(57) ABSTRACT

The present invention relates to a novel polyamide alloy composition that is useful for forming objects that may be used for the storage and transport of fluids. The polyamide alloy is a blend of at least one polyamide and at least one modified polyolefin having both medium to hard and soft domains. The polyamide forms the continuous phase of the alloy. The alloy may also contain, and preferably does contain, a thermal and light stabilization compound, at least one unmodified polyolefin, and at least one plasticizer. The polyamide alloy composition is useful in forming tanks, hoses and tubes used in the transport of liquid or gaseous fluids, including fluids under pressure.

12 Claims, No Drawings

(56) References Cited

FOREIGN PATENT DOCUMENTS

| FR | 2812928 | 2/2002 |
| GB | 2226035 | 6/1990 |
| JP | 2000313079 | 11/2000 |
| JP | 2000313089 A | 11/2000 |
| JP | 2007-543549 | 11/2005 |

* cited by examiner

ALLOY COMPOSITION USEFUL FOR FLUID TRANSPORT OBJECTS

This application claims benefit, under U.S.C. §119 or §365 of U.S. Provisional Application No. 60/631,934, filed Nov. 30, 2004; and PCT/US2005/042807 filed Nov. 23, 2005.

FIELD OF THE INVENTION

The present invention relates to a novel polyamide alloy composition that is useful for forming objects that may be used for the storage and transport of fluids. The polyamide alloy is a blend of at least one polyamide and at least one modified polyolefin having both hard and soft domains. The polyamide forms the continuous phase of the alloy. The alloy may also contain, and preferably does contain, a thermal and light stabilization compound, at least one unmodified polyolefin, and at least one plasticizer. The polyamide alloy composition is useful in forming tanks, hoses and tubes used in the transport of liquid or gaseous fluids, including fluids under pressure.

BACKGROUND OF THE INVENTION

U.S. Pat. No. 6,066,377 discloses hoses. that consist of an inner layer (in contact with the braking air) and of an outer layer made of polyamide, nylon-11 or nylon-12, and between these layers are one or two layers of high-density polyethylene (HDPE) and possibly a polyester reinforcing braid. The HDPE must be radiation-crosslinked so that the tube has mechanical strength, in particular burst strength, and it must contain a functionalized polyolefin in order to create adhesion between the polyamide and the HDPE. Examples are not reproducible and result in random results. The mechanical properties of the HDPE are insufficient and weaken the tube.

Patent application FR 2 812 928 discloses layered tubing made of polyamide formed from outer and inner layers made of nylon-11 or nylon-12, with inner layers made of nylon-6 containing, by weight, 14% of a plasticizer (butylbenzenesulphonamide), 7% of residual caprolactam, 10% of maleic-anhydride-grafted EPDM elastomer and 5% of maleic-anhydride-grafted polyethylene. The nylon-6 and nylon-11 or nylon-12 layers are bonded together with a tie layer. The tie layer is preferably a nylon-6, 12 or an anhydride-modified polyolefin. The plasticizer and the residual caprolactam of the PA-6 layers exude and cause delamination of the layers and stiffening of the PA-6 layers. The hose no longer has sufficient mechanical properties. In addition, the nylon-6 has a much greater water uptake than PA-11 or PA-12 and therefore its mechanical properties are substantially degraded.

A polyamide alloy has now been found which optimizes the balance between the amount and type of lower cost polyolefins/modified polyolefins used in the polyamide alloy, and the strict performance standards of some of the regulated industries in which the alloy is used. The polyolefin phase of the invention has both soft and hard domains.

SUMMARY OF THE INVENTION

It is an object of the invention to provide polyamide alloys that are lower in cost compared to pure polyamides, yet capable of forming finished objects that meet high industry standards.

It is a further object of the invention to provide finished objects, and especially hoses made from the polyamide alloys, which will pass current industry standards.

The objectives of the invention are achieved, in accordance with the principles of a preferred embodiment of the invention, by an alloy composition comprising:
 a) 50 to 95 percent by weight of one or more polyamides;
 b) 0 to 46 percent by weight of one or more unmodified polyolefins;
 c) 4 to 50 percent by weight of one or more modified polyolefins, having both hard and soft dispersed phases;
 d) 0 to 18 percent by weight of one or more plasticizers; and
 e) 0.5 to 3 percent by weight of one or more stabilization compounds,
wherein the continuous phase of the alloy is comprised of the polyamide(s) of a),
and wherein the sum of b) plus c) is from 4 to 50 percent by weight.

According to a second embodiment, the invention relates to an object for fluid transport and/or storage comprising at least one layer comprising
 a) 50 to 95 percent by weight of one or more polyamides;
 b) 0 to 46 percent by weight of one or more unmodified polyolefins;
 c) 4 to 50 percent by weight of one or more modified polyolefins, having both hard and soft dispersed phases;
 d) 0 to 18 percent by weight of one or more plasticizers; and
 e) 0.5 to 3 percent by weight of one or more stabilization compounds,
wherein the continuous phase of the alloy is comprised of the polyamide(s) of a), and
wherein the sum of b) plus c) is from 4 to 50 percent by weight.

DETAILED DESCRIPTION OF THE INVENTION

The present invention relates to an alloy of at least one polyamide and at least one modified polyolefin, with optionally unmodified polyolefins, plasticizers and stabilizers.

With regard to the polyamide, the term "polyamide" is understood to mean products resulting from the poly condensation:
 of one or more amino acids, such as aminocaproic, 7-aminoheptanoic, 11-aminoundecanoic and 12-aminododecanoic acid or of one or more lactams, such as caprolactam, oenantholactam and lauryllactam;
 of one or more salts or mixtures of diamines such as hexamethylenediamine, dodecamethylenediamine, met-axylenediamine, bis(p-aminocyclohexyl)methane and trimethylhexamethylenediamine with diacids such as isophthalic, terephthalic, adipic, azelaic, suberic, sebacic and dodecanedicarboxylic acids.

As examples of polyamides, mention may be made of PA-6, PA-6,6, PA-11 and PA-12.

It may also be advantageous to use copolyamides. Mention may be made of the copolyamides resulting from the condensation of at least two alpha, omega-aminocarboxylic acids or of two lactams or of a lactam and of an alpha, omega-aminocarboxylic acid. Mention may also be made of the copolyamides resulting from the condensation of at least one alpha, omega-aminocarboxylic acid (or a lactam), at least one diamine and at least one dicarboxylic acid.

As examples of lactams, mention may be made of those which have from 3 to 12 carbon atoms on the main ring and are possibly substituted. Mention may be made, for example, of β,β-dimethylpropriolactam, α,α-dimethylpropriolactam, amylolactam, caprolactam, capryllactam and lauryllactam.

As examples of alpha, omega-aminocarboxylic acids, mention may be made of aminoundecanoic acid and aminododecanoic acid. As examples of dicarboxylic acids, mention may be made of adipic acid, sebacic acid, isopthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH.

The diamine may be an aliphatic diamine having from 6 to 12 carbon atoms; it may be a saturated cyclic and/or arylic diamine. As examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM), and bis(3-methyl-4-aminocyclohexyl)methane (BMACM).

As examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA 6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-amino undecanoic acid, adipic acid and hexamethylenediamine (PA-6/6,6/11/12), and copolymers of lauryllactam, azelaic acid and hexamethylenediamine (PA-6,9/12).

Polyamide could be also of formula X.Y/Z or 6.Y2/Z in which:

X denotes the residues of an aliphatic diamine having from 6 to 10 carbon atoms, Y denotes the residues of an aliphatic dicarboxylic acid having from 10 to 14 carbon atoms, Y2 denotes the residues of an aliphatic dicarboxylic acid having from 15 to 20 carbon atoms and Z denotes at least one unit chosen from the residues of a lactam, the residues of an α,ω-aminocarboxylic acid, the unit X1, Y1 in which X1 denotes the residues of an aliphatic diamine and Y1 denotes the residues of an aliphatic dicarboxylic acid, the weight ratios Z/(X+Y+Z) and Z/(6+Y2+Z) being between 0 and 15%

It is also possible to use polyamide blends. Advantageously, the relative viscosity of the polyamides, measured as 1% solution in sulphuric acid at 20° C., is between 1.5 and 5.

The polyamide, as used herein, could also mean copolymers having polyamide blocks and polyether blocks. These result from the copolycondensation of polyamide blocks having reactive ends with polyether blocks having reactive ends, such as, inter alia:

1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated alpha, omega-polyoxyalkylene blocks called polyetherdiols;
3) polyamide blocks having dicarboxylic chain ends with polyetherdiols, the products obtained being, in this particular case, polyetheresteramides. Advantageously, these copolymers are used.

Polyamide blocks having dicarboxylic chain ends derive, for example, from the condensation of alpha, omega-aminocarboxylic acids, of lactams or of dicarboxylic acids and diamines in the presence of a chain-stopping dicarboxylic acid.

The polyether may, for example, be a polyethylene glycol (PEG), a polypropylene glycol (PPG), polytrimethyleneglycol or a polytetramethylene glycol (PTMG). The latter is also called polytetrahydrofuran (PTHF).

The number-average molar mass $\overline{M}_n$ of the polyamide blocks is between 300 and 15 000 and preferably between 600 and 5000. The mass $\overline{M}_n$ of the polyether blocks is between 100 and 6000 and preferably between 200 and 3000.

Polymers having polyamide blocks and polyether blocks may also include randomly distributed units. These polymers may be prepared by the simultaneous reaction of the polyether and polyamide-block precursors.

For example, it is possible to react polyetherdiol, a lactam (or an alpha, omega-amino acid) and a chain-stopping diacid in the presence of a small amount of water. A polymer is obtained having essentially polyether blocks and polyamide blocks of very variable length, but also the various reactants, having reacted in a random fashion, which are distributed randomly along the polymer chain.

These polymers having polyamide blocks and polyether blocks, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in meta-cresol at 25° C. for an initial concentration of 0.8 g/100 ml. The MFIs may be between 5 and 50 (235° C., with a load of 1 kg).

The polyetherdiol blocks are either used as such and copolycondensed with polyamide blocks having carboxylic ends or they are aminated in order to be converted into diamine polyethers and condensed with polyamide blocks having carboxylic ends. They may also be mixed with polyamide precursors and a chain stopper in order to make polyamide-block and polyether-block polymers having randomly distributed units.

Polymers having polyamide and polyether blocks are described in U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

The ratio of the amount of copolymer having polyamide blocks and polyether blocks to the amount of polyamide is, by weight, advantageously between 10/90 and 60/40.

The term polyamide may further refer to a blend of a pure polyamide with a polyamide/polyether block copolymer. This amounts to replacing part of the polyamide with a copolymer having polyamide blocks and polyether blocks, that is to say using a blend comprising at least one of the above polyamides and at least one copolymer having polyamide blocks and polyether blocks. The copolymers having polyamide blocks and polyether blocks are defined above. Mention may be made, for example, of blends of (i) PA-6 and (ii) a copolymer having PA-6 blocks and PTMG blocks, blends of (i) PA-6 and (ii) a copolymer having PA-12 blocks and PTMG blocks, and blends of (i) PA-12 and (ii) a copolymer having PA-6 or PA-12 blocks and PTMG blocks.

The polyamides used in the invention advantageously have a number-average molecular mass $\overline{M}_n$ generally greater than or equal to 12000 and advantageously between 15000 and 50000. Their weight-average molecular mass $\overline{M}_w$ is generally greater than 24000 and advantageously between 30000 and 100000. Their inherent viscosity (measured at 20° C. for a specimen consisting of $5 \times 10^{-3}$ g per $cm^3$ of meta-cresol) is in general greater than 0.9.

As examples of aliphatic polyamides resulting from the condensation of an aliphatic diamine having from 6 to 12 carbon atoms and an aliphatic diacid having from 9 to 12 carbon atoms, mention may be made of:

PA-6,12, resulting from the condensation of hexamethylene diamine and 1,12-dodecanedioic acid;

PA-9,12, resulting from the condensation of the $C_9$ diamine and 1,12-dodecanedioic acid;

PA-10,10, resulting from the condensation of the $C_{10}$ diamine and 1,10-decanedioic acid; and PA-10,12, resulting from the condensation of the $C_{10}$ diamine and 1,12-dodecanedioic acid.

As regards the 11/12 copolyamides having either more than 90% of nylon-11 units or more than 90% of nylon-12 units, these result from the condensation of 1-aminoundecanoic acid with lauryllactam (or the $C_{12}$ alpha, omega-amino acid).

Advantageously, the polyamide contains an organic or mineral catalyst which is added during the polycondensation. In one embodiment, this a phosphorous-containing acid, such as phosphoric, phosphorous, or hypophosphoric acid. The amount of catalyst is between 50 to 15000 ppm relative to the amount of polyamide.

It would not be outside the scope of the invention to use a polyamide blend.

Advantageously, the polyamide is PA-11 or PA-12.

The polyamide phase of the alloy is the continuous phase, and makes up from 50 to 95 percent by weight of the alloy, and preferably from 60 to 90 percent by weight.

As regards the modified polyolefin having both hard and soft domains, the hard and soft domains may be provided by the combination of a modified polyolefin having hard domains and a modified polyolefin having soft domains. It could also be provided by a single modified polyolefin having both hard and soft domains, which is a preferred embodiment. By "hard" as used herein to describe domains, is meant everything ranging from medium to hard domains, wherein the flexural modulus is at least 200 Mpa advantageously between 200 and 400 Mpa. The hard domain will generally have a density of 0.900 and above, and preferably 0.915 and above, more preferably between 0.915 and 0.925. By "soft" as used herein in describing domains is meant having a flexural modulus of less than or equal to 100 Mpa and/or is an elastomer. The density of the soft domain is generally from 0.865 to 0.915, and preferably from 0.870 to 0.900. The hard domains provide burst resistance, while the soft domains provide low temperature impact modification.

Advantageously the modified polyolefin having both hard and soft domains is (i) either a blend of a thermoplastic polyolefin and an elastomer at least the poloyolefin and/or the elastomer is grafted (by maleic anhydride or equivalent) said blend being eventually blended with a polyolefin, (ii) either a blend of a thermoplastic polyolefin and an elastomer said blend being grafted (by maleic anhydride or equivalent), said blend being eventually blended with a polyolefin. The blend of a thermoplastic polyolefin and an elastomer said blend being grafted is also called "cografted blend of a thermoplastic polyolefin and an elastomer". By way of example the thermoplastic polyolefin can be, LLDPE and the elastomer can be EPR, EPDM or metallocene polyethylene. The proportion of the thermoplastic polyolefin and the elastomer can be in the weight ratio thermoplastic polyolefin/elastomer from 10/90 to 90/10.

By way of example, the modified polyolefin may be an alpha-olefin polymer having reactive groups (functional groups); such reactive groups include acid, anhydride or epoxy functional groups, provided of course that the flexural modulus is in accordance with the above specified ranges. As an example, mention may be made of polyolefins grafted or copolymerized or terpolymerized by unsaturated epoxides such as glycidyl methacrylate or by carboxylic acids or the corresponding salts or esters, such as (meth)acrylic acid (the latter possibly being completely or partially neutralized by metals such as Zn, etc.), or else by carboxylic acid anhydrides, such as maleic anhydride. Advantageously, the modified polyolefins are chosen from any polymer comprising alpha-olefin units and units carrying polar reactive functional groups, such as epoxy, carboxylic acid or carboxylic acid anhydride functional groups. As examples of such polymers, mention may be made of ethylene-alkyl acrylate-maleic anhydride or glycidyl methacrylate terpolymers, such as the Applicant's LOTADER® polymers, or polyolefins grafted by maleic anhydride, such as the Applicant's OREVAC® polymers, and ethylene-alkyl acrylate-(meth)acrylic acid terpolymers. Mention may also be made of polyethylene homopolymers or copolymers grafted by a carboxylic acid anhydride and then condensed with polyamides or monoamine polyamide oligomers.

The modified polyolefin may be chosen from one or more of the following (co)polymers grafted with maleic anhydride or glycidyl methacrylate, in which the degree of grafting is, for example, from 0.01 to 5% by weight:

PE, copolymers of ethylene with propylene, butene, hexene or octene, containing for example from 35 to 80% ethylene by weight, which may be low density, medium density or high density;

ethylene/alpha-olefin copolymers, such as ethylene/propylene, EPR (the abbreviation for ethylene/propylene rubber) and ethylene/propylene/diene (EPDM);

styrene/ethylene-butene/styrene (SEBS), styrene/butadiene/styrene (SBS), styrene/isoprene/styrene (SIS) and styrene/ethylene-propylene/styrene (SEPS) block copolymers;

ethylene-vinyl acetate copolymers (EVA) containing up to 40% vinyl acetate by weight;

ethylene-alkyl (meth)acrylate copolymers containing up to 40% alkyl (meth)acrylate by weight; and ethylene-vinyl acetate (EVA)/alkyl (meth)acrylate copolymers containing up to 40% by weight of comonomers.

The modified polyolefin may also be chosen from ethylene/propylene copolymers comprising predominantly propylene, these copolymers being grafted by maleic anhydride and then condensed with a monoamine polyamide (or a polyamide oligomer).

The polymer to be grafted, or polymers for cograpfting, are grafted with an unsaturated carboxylic acid. It would not be outside the scope of the invention to use a functional derivative of this acid. Examples of unsaturated carboxylic acids are those having from 2 to 20 carbon atoms, such as acrylic, methacrylic, maleic, fumaric and itaconic acids. The functional derivatives of these acids include, for example, the anhydrides, the ester derivatives, the amide derivatives, the imide derivatives and the metal salts (such as the alkali metal salts) of unsaturated carboxylic acids.

Unsaturated dicarboxylic acids having 4 to 10 carbon atoms and their functional derivatives, particularly their anhydrides, are particularly preferred grafting monomers. These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides. Advantageously maleic anhydride is used.

Various known processes can be used to graft a grafting monomer onto polyolefin polymer or polymers. For example, this may be achieved by heating the polymers to a high temperature, about 150° C. to about 300° C., in the presence or absence of a solvent and with or without a radical initiator.

In the graft-modified polyolefin(s) obtained in the above-mentioned manner, the amount of grafting monomer may be chosen appropriately, but it is preferably from 0.01 to 10% and better still from 600 ppm to 2%, with respect to the weight of grafted polymer. The amount of grafted monomer is determined by assaying the succinic functional groups by FTIR spectroscopy.

The modified polyolefin may also be a copolymer or terpolymer of at least the following monomers: (1) ethylene; (2) an alkyl (meth)acrylate or a vinyl ester of a saturated carboxylic acid and (3) an anhydride, such as maleic anhydride or (meth)acrylic acid or epoxy such as glycidyl (meth)acrylate. As examples of functionalized polyolefins of the latter type, mention may be made of the following copolymers, in which ethylene preferably represents at least 60% by weight and in which the termonomer (the functional group) represents, for example, from 0.1 to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers; and ethylene/vinyl acetate or alkyl (meth)acrylate/(meth) acrylic acid or maleic or glycidyl methacrylate anhydride copolymers.

In the above copolymers, the (meth)acrylic acid may be salified with Zn or Li.

The modified polyolefin of the invention is present in the alloy at from 4 to 46 percent by weight, preferably from 4 to 40 percent and most preferably from 5 to 30 percent by weight. The preferred level of the modified polyolefin will depend in part to the level and chemistry of the polyamide in which it will make up all or part of the non-continuous phase.

Such modified polyolefin having both hard and soft domains are described in WO 97/27259, the content of which being incorporated by reference in the present application. It describes a blend consisting of (a) a polyethylene of the LLDPE, VLDPE or LDPE type, (b) 5 to 35% of a grafted metallocene polyethylene and (c) 0 to 35% of an elastomer.

The modified polyolefin having both hard and soft domains are also described in U.S. Pat. No. 6,528,587. It describes 5 to 35 parts of a polymer (A) which itself consists of a blend of 80 to 20 parts of a metallocene polyethylene (A1) of relative density between 0.865 and 0.915 and of 20 to 80 parts of a non-metallocene LLDPE polyethylene (A2), the blend (A1) and (A2) being cografted by an unsaturated carboxylic acid; and 95 to 65 parts of a polyethylene (B) chosen from ethylene homopolymers or copolymers and elastomers. Advantageously the blend of (A) and (B) being such that:

the content of grafted unsaturated carboxylic acid is between 30 and $10^5$ ppm, and the MFI (ASTM D 1238 standard: 190° C./2.16 kg) is between 0.1 and 10 g/10 min.

With regard to (A1), the term "metallocene polyethylene" is understood to mean the polymers obtained by copolymerizing ethylene with an alpha-olefin, such as propylene, butene, hexene or octene for example, in the presence of a monosite catalyst generally consisting of an atom of a metal which may, for example, be zirconium or titanium and of two cyclic alkyl molecules attached to the metal. More specifically, the metallocene catalysts are usually composed of two cyclopentadiene rings attached to the metal. These catalysts are frequently used with aluminoxanes as cocatalysts or activators, preferably methylaluminoxane (MAO). Hafnium can also be used as the metal to which the cyclopentadiene is attached. Other metallocenes may include transition metals of Groups IVA, VA and VIA. Metals from the series of lanthanides can also be used.

These metallocene polyethylenes may also be characterized by their ratio $\overline{M_w}/\overline{M_n}$<3 and preferably <2, in which $\overline{M_w}$ and $\overline{M_n}$ denote the weight-average molar mass and the number-average molar mass, respectively. Also termed metallocene polyethylene are polymers having an MFR (melt flow ratio) of less than 6.53 and a ratio $\overline{M_w}/\overline{M_n}$ greater than the MFR less 4.63. MFR denotes the ratio of the $MFI_{10}$ (the MFI under a load of 10 kg) to the $MFI_2$ (the MFI under a load of 2.16 kg). Other metallocene polyethylenes are defined by an MFR equal to or greater than 6.13 and an $\overline{M_w}/\overline{M_n}$ ratio of less than or equal to the MFR less 4.63.

Such modified polyolefin having both hard and soft domains are also described in EP 1400566 the content of which being incorporated in the present application. The described composition is:

10 to 35 weight % of a polymer (A) itself composed of a blend of 80 to 20 weight % of a metallocene polyethylene (A1) with a density of between 0.865 and 0.915 and of 20 to 80 weight % of a non-metallocene LLDPE polyethylene (A2), the blend of polymers (A1) and (A2) being cografted by a grafting monomer chosen from unsaturated carboxylic acids and their derivatives, the content of the grafting monomer in the said blend being comprised between 30 and 100 000 ppm;

40 to 60 weight % of a styrene/butadiene/styrene block copolymer (B) with 50 to 90 mol % of styrene, 20 to 35 weight % of PE (C);

the total making 100%.

Advantageously the MFI or melt flow index (ASTM D 1238, 190° C., 2.16 kg) is comprised between 0.1 and 10 g/10 min.

According to one embodiment, the composition is characterized in that the density of (A2) is comprised between 0.900 and 0.950.

According to one embodiment, the composition is characterized in that the proportion of grafting monomer in the blend of polymers (A1) and (A2) is comprised between 600 and 5 000 ppm.

According to one embodiment, the composition is characterized in that the grafting monomer is maleic anhydride.

According to one embodiment, the composition is characterized in that the PE (C) has a density comprised between 0.870 and 0.935 and is an LLDPE or a metallocene PE.

Such modified polyolefin having both hard and soft domains are also described in WO 04 029173. This composition comprises:

5 to 35% by weight of a polymer (A) itself composed of a blend of 80 to 20% by weight of a metallocene polyethylene (A1) with a density of between 0.863 and 0.915 and of 20 to 80% by weight of a non-metallocene LLDPE polyethylene (A2) with a density of between 0.900 and 0.950, the blend of polymers (A1) and (A2) being cografted by a grafting monomer chosen from unsaturated carboxylic acids and their derivatives, the content of the grafting monomer in said blend being between 30 and 100 000 ppm, preferably between 600 and 5 000 ppm;

95 to 65% by weight of metallocene polyethylene (B) homo- or copolymer, the comonomer of which comprises 3 to 20 carbon atoms, preferably 4 to 8 carbon atoms, the density of which is between 0.863 and 0.915 and the MFI, melt flow index, of which, measured under 2.16 kg at 190° C. according to Standard ASTMD 1238, is between 0.5 and 30, preferably between 3 and 15, g/10 min;
the total forming 100%, Advantageously the blend of (A) and (B) being such that its MFI is between 0.1 and 15, preferably between 1 and 13, g/10 min.

According to one embodiment, the grafting monomer for the composition is maleic anhydride.

According to one embodiment, the composition additionally comprises an ethylene/alkyl (meth)acrylate copolymer (C).

According to one embodiment, the MFI of (A) for the composition is between 0.1 and 5 g/10 min (ASTMD 1238 at 190° C. under 2.16 kg).

In one preferred embodiment, the modified polyolefin is a linear-low density polyethylene (LLDPE) containing very low density (soft) domains and medium density domains which are co-grafted with maleic anhydride in a common extrusion step. This results in a well compatibilised polyethylene system with separate hard and soft domains. While not being bound to any particular theory, it is possible that the hard and soft domains may be discontinuous, or may perhaps form nodules on the polyethylene system. The resulting nodular architecture could allow the soft phase to act as a very efficient impact modifier because it would be located in an efficient spatial place. The result would be both a soft and hard architecture.

As regards the embodiment in which unmodified polyolefin is present advantageously this unmodified polyolefin is HDPE. The structure of the composition of the invention is, in a polyamide matrix (continuous phase), hard HDPE core and "satellites" at the periphery made of the modified polyolefin having hard and soft domains. If both hard PE and soft PE domains exist, and the soft PE is at the right place, good performance will be achieved at both 100° C. and at −40° C. Consequently the whole material will still be sufficiently "hard" at 100° C. because HDPE is not melted, providing good properties at 100° C. (burst) when the resin is transformed in to shape of a hose; yet at the same time having sufficient −40° C. cold properties (impact) because still soft and ductile domains are well/located to absorb energy when impact occurs. The above relates to when the compound is transformed into hose or molded test specimen.

As regards the unmodified polyolefin of the alloy, it is conventionally a homopolymer or an alpha-olefin or di-olefin copolymer, such as, for example, ethylene, propylene, 1-butene, 1-octene and butadiene. By way of example, mention may be made of:
  polyethylene homopolymers and copolymers, particularly LDPE, HDPE, LLDPE (linear low-density polyethylene),
  propylene homopolymers or copolymers;
  copolymers of ethylene with at least one product chosen from salts or esters of unsaturated carboxylic acids, such as alkyl (meth)acrylate (for example methyl acrylate), or vinyl esters of saturated carboxylic acids, such as vinyl acetate (EVA), the proportion of comonomer possibly being up to 40% by weight.

The unmodified polyolefin is present in the alloy at from 0-46 percent by weight, and preferably from 5 to 30 percent by weight.

The total portion of the alloy made up of modified and unmodified polyolefins will be in the range of from 4 to 50 percent, and preferably from 5 to 35 percent by weight.

The term "alkyl (meth)acrylate" in the modified or unmodified polyolefins denotes C1 to C8 alkyl acrylates and methacrylates, these possibly being chosen from methyl acrylate, ethyl acrylate, n-butyl acrylate, isobutyl acrylate, 2-ethyl hexylacrylate, cyclohexyl acrylate, methyl methacrylate and ethyl methacrylate.

The polyolefin copolymers mentioned above, may be random copolymers or block copolymers and have a linear or branched structure.

The molecular weight, the MFI and the density of these polyolefins may also vary widely, as a person skilled in the art will appreciate. MFI is the abbreviation for Melt Flow Index, which is measured according to the ASTM 1238 standard.

Advantageously, the unmodified polyolefins are chosen from polypropylene homopolymers or copolymers and any ethylene homopolymer or copolymer of ethylene with a comonomer of the higher alpha-olefin type, such as butene, hexene, octene or 4-methyl-1-pentene. Mention may be made, for example, of PP, high-density PE, medium-density PE, linear low-density PE, low-density PE These polyethylenes are known to a person skilled in the art as being produced according to a "radical" process, using catalysis of the "Ziegler" type or, more recently, using catalysis referred to as "metallocene" catalysis.

Advantageously the density of the unmodified polyolefin is above 0.930, preferably above 0.940 and more preferably above 0.950. Advantageously it is a HDPE. More advantageously the flexural modulus of the unmodified polyolefin is greater than 700 Mpa and lower than 1600 Mpa.

The proportion of unmodified polyolefins to modified polyolefins depends on the amount of functional groups present in the modified polyolefins and on their reactivity. Advantageously, the weight ratios ranging from 5/35 to 35/5 are used.

As regards the plasticizer in the polyamide alloy, these consist of one or more plasticizers chosen from benzene sulfonamide derivatives, such as N-butyl benzene sulfonamide (BBSA), ethyl toluene sulfonamide or N-cyclohexyl toluene sulfonamide; esters of hydroxybenzoic acids, such as 2-ethylhexyl-para-hydroxybenzoate and 2-decylhexyl-para-hydroxybenzoate; esters or ethers of tetrahydrofurfuryl alcohol, like oligoethyleneoxytetra-hydrofurfuryl alcohol; and esters of citric acid and of hydroxy malonic acid such as oligoethyleneoxy malonate. A particularly preferred plasticizer is N-butyl benzene sulfonamide (BBSA). It would not be outside the scope of the invention to use a mixture of plasticizers. The plasticizer may be introduced into the polyamide during the polycondensation or subsequently. The proportion of plasticizer in the alloy may be between 0 and 18% by weight and preferably from 1 to 10 percent by weight.

As regards the stabilizer, from 0.5 to 3 percent by weight of one or more thermal and light stabilizers are added to the alloy. The thermal stabilizers provide needed stability during processing of the application, and light, or UV stabilizers provide stabilization against radiation, as required in many applications of the polyamide/modified polyolefin alloy.

Other additives known in the art, may also be added in small amounts to the alloy. These include, but are not limited to colorants, pigments, brighteners, antioxidants, and fire retardants.

According to a first preferred embodiment of the polyamide alloy, the alloy comprises
  60 to 90 percent by weight of a polyamide,
  8 to 20 percent of a modified polyolefin,
  10 to 30 percent of one or more unmodified polyolefins,
  4 to 10 percent by weight of plasticizer, and
  0.8-1.5 percent by weight of one or more stabilizers
in which the modified polyolefin is a maleic anhydride unmodified polyolefin having both soft and hard domains or a mixture of a modified polyolefin having hard domains and a modified polyolefin having soft domains, the unmodified polyolefin is a high-density polyethylene (HDPE), the polyamide is PA 6, PA11, PA 12, or a blend thereof, and the plasticizer is BBSA.

According to a second preferred embodiment of the polyamide alloy, the polyolefin comprises polypropylene as well as metallocene catalyzed polpropylene.

According to a third preferred embodiment of the polyamide/polyolefin alloy, the polyolefin comprises a polyethylene of the EVA, LLDEP, VLDPE or metallocene type and the modified polyolefin comprises one or more ethylene/alkyl (meth)acrylate/maleic anhydride copolymers.

Advantageously, the ethylene/alkyl (meth)acrylate/maleic anhydride copolymers comprise from 0.2 to 10% by weight of maleic anhydride and up to 40% and preferably 5 to 40% by weight of alkyl (meth)acrylate. Their MFIs are between 2 and 100 g/10 min. (190° C./2.16 kg). The allyl (meth)acrylates have already been mentioned above. The melting point is between 80 and 120° C. These copolymers are commercially available. They are produced by radical polymerization at a pressure that may be between 200 and 2500 bar.

As regards the high-density polyethylene in the preferred embodiments, its density is advantageously between 0.940 and 0.965 and the MFI between 0.1 and 5 g/10 min (190° C./2.16 kg).

The alloy of the invention is formed by blending together the components of the alloy, by means known in the art. In one preferred embodiment, reactive extrusion using a twin screw design is used for blending the elements of the alloy, and also for forming the finished object.

The polyamide alloy of the invention provides many advantages to objects formed from it compared to pure polyamides. These advantages include a) a lower cost of materials, b) reduced density, c) reduced moisture pick up, d) it serves as both an impact modifier and a compatibilizer, e) excellent heat aging properties, f) has excellent low-temperature impact properties, g) good metallic salt resistance, h) good adhesion between layers of a multi-layer structure, i) inert—chemical, light and thermal resistant.

The polyamide/modified polyolefin alloy of the invention is useful in forming an object for fluid transport and/or storage. The formed object may consist of a monolayer, or may be a multilayer structure. At least one layer, preferably the inner layer, outer layer, or both are made of the alloy of the invention. The formed object may contain one or more layers between the inner and out layers composed of other polyamides, and in particular PA-6, or other polymers. The formed object may contain fillers and/or reinforcement, such as, but not limited to, glass fibers, nano particles, or braiding. One layer of the formed object may be conductive.

A tie layer, or adhesive layer may optionally be used between layers of the formed object, as known in the art, and as described in US 2004-/0071913, incorporated herein by reference.

Fluids for transport or storage in objects formed from the alloy of the invention may be liquids or gases, and include, but are not limited to water, air, gasoline, diesel fuel, gases, and chemicals. The fluids may be under pressure.

In one embodiment, the formed object is a hose. The hose will have one or both inner and outer surfaces composed of the alloy of the invention. If only one surface is composed of the alloy, the other surface preferably is either PA 11 or PA 12.

The inside diameter of the hoses of the present invention may be between 4 and 30 mm and advantageously between 5 and 25 mm. Their thickness may be between 0.5 and 5 mm.

These hoses are manufactured by coextrusion. In those which contain a reinforcing braid, this is placed after having extruded the innermost layers and then, on top of this braid, the other layers are coextruded by a device called a "crosshead". Several interlayers and one or more braids may be incorporated. All of these techniques are known per se.

The hoses of the present invention exhibit very good chemical resistance of their outer layer, in particular resistance to zinc chloride. They also exhibit very good mechanical behaviour, in particular allowing them to be connected by means of clamp connectors or fittings.

EXAMPLES

Example 1

The following formulations were blended in the proportions given in Table 1 by reactive extrusion, and co-extruded to form a hose. Tensile properties were tested according to ASTM D 638 using type IV tensile specimens and a crosshead travel of two inches per minute. Elongation was measured using an Instron high-resolution digital (HRD) extensometer. Flexural properties were tested according to ASTM D 790 using the gage section cut from type I tensile specimens. Impact properties were tested according to ASTM D 256 using the gage section cut from type I tensile specimens. The test results are shown in Table 2.

The modified polyolefin (referred to as soft and hard modifier in the following table) is made according to U.S. Pat. No. 6,528,587, incorporated herein. The plasticizer is BBSA, the HDPE has a density of 0.962, the soft modifier is an ethylene-propylene rubber (EPR), PA12 is an extrusion grade of polyamide 12, the high viscosity PA 11 has an intrinsic viscosity of 1.3-1.6, and the low viscosity PA 11 has an intrinsic viscosity of 0.93-1.08.

TABLE 1

| Sample | PA12 | PA11 High vis | PA11 low vis | PA11 w/ Different catalyst | Soft Modifier | Soft and hard modifier | HDPE % Hard modifier | Plasticizer | Heat and light stabilizer |
|---|---|---|---|---|---|---|---|---|---|
| 1 | 0 | 0 | 63.4 | 0 | 16 | 0 | 16 | 3.4 | 1.2 |
| 2 | 71.85 | 0 | 0 | 0 | 6 | 0 | 14 | 7 | 1.2 |
| 3 | 0 | 63.4 | 0 | 0 | 16 | 16 | 0 | 3.4 | 1.2 |
| 4 | 0 | 0 | 0 | 59.4 | 0 | 10 | 26 | 3.4 | 1.2 |
| 5 | 59.4 | 0 | 0 | 0 | 0 | 10 | 26 | 3.4 | 1.2 |
| 6 | 0 | 0 | 0 | 63.4 | 16 | 0 | 16 | 3.4 | 1.2 |
| 7 | 0 | 59.4 | 0 | 0 | 0 | 10 | 26 | 3.4 | 1.2 |
| 8 | 0 | 0 | 59.4 | 0 | 0 | 10 | 26 | 3.4 | 1.2 |
| 9 | 0 | 0 | 63.4 | 0 | 0 | 16 | 16 | 3.4 | 1.2 |

TABLE 2

Preliminary Physical Properties of some of the formulation

| | Tensile Strength at Break psi, n = 5 | Elongation at Break, psi, n = 5 | Tensile Stress at Yield, psi, n = 5 | Elongation at Yield, psi, n = 5 | Tensile Stress at 20% Offset, psi, n = 5 | Flexural Modulus, Tangent, psi, n = 5 | Impact Strength, IZOD, fl-lb/in, n = 10 |
|---|---|---|---|---|---|---|---|
| 1 | 6720 (240) | 398 (12) | 3420 (10) | 38 (1) | 3350 (10) | 51150 (800) | No Break |
| 2 | 8370 (70) | 383 (3) | Not detected | Not detected | 3760 (20) | 48600 (700) | No Break |
| 3 | 7040 (200) | 417 (10) | 3310 (10) | 41 (2) | 3230 (10) | 49600 (1860) | No Break |
| 4 | 7560 (90) | 394 (4) | Not detected | Not detected | 3860 (10) | 59360 (860) | No Break |
| 5 | 8640 (260) | 397 (12) | Not detected | Not detected | 3960 (10) | 66650 (2250) | No break |
| 6 | 6690 (170) | 370 (8) | Not detected | Not detected | 3350 (10) | 43890 (420) | No Break |
| 7 | 7780 (130) | 386 (5) | Not detected | Not detected | 3620 (3) | 68430 (1970) | No Break |
| 8 | 7150 (450) | 393 (22) | 3810 (20) | 34 (1) | 3770 (20) | 58720 (1960) | No Break |
| 9 | 6390 (280) | 364 (15) | 3640 (20) | 37 (2) | 3590 (20) | | No Break |
| Com. PA12, | 7250 (630) | 270 (26) | Not detected | Not detected | 3620 (20) | 47140 (690) | No Break |
| Com. PA11 | 6490 (210) | 247 (12) | Not detected | Not detected | 3410 (30) | 39540 (740) | No Break |

Example 2

A formulation of the invention was formulated in the manner described in Example 1, having the soft and hard modifier made according to U.S. Pat. No. 6,528,687 (Example 2A) A similar comparative formulation (Example 2B) was made using Dupont Fusabond E MB-100D) in place of the soft and hard modifier of Example 2A.

Flexural properties were measured as in Example 1. Each test was conducted on five samples, with the mean and standard deviation presented in Table 3. A flexibility of less than 40,000 psi per ASTM D 790 and a minimum tensile strength at 20% offset per D638 of more than 3000 psi are required to meet the airbrake application requirements.

| | FLEXURAL MODULUS TANGENT (psi) | |
|---|---|---|
| Example | Mean | Standard Deviation |
| 2A | 37,791 | 533 |
| 2B | 53,478 | 468 |

What is claimed is:

1. A multilayer structure for fluid transport and/or storage comprising as the inner layer, or outer layer a blend of:
   a) 60-90 percent by weight of one or more polyamides as the continuous phase;
   b) 10 to 30 percent by weight of one or more unmodified high density polyethylene (HDPE) having a flexural modulus of from 700 Mpas to 1600 Mpas;
   c) 8-20 percent by weight of one or more modified polyolefins in the disperse phase having two distinct domains, one having a flexural modulus of less than or equal to 100 Mpa (soft) and/or is an elastomer, the other having a flexural modulus of 200 Mpa to 400 Mpa (medium) and a density of 0.915 to 0.925, wherein said medium and soft domains of said modified polyolefin are present on the same modified polyolefin;
   d) 4-10 percent by weight of one or more plasticizers chosen from benzene sulfonamide derivatives; and
   e) 0.8-1.5 percent by weight of one or more stabilization compounds, wherein the structure is, in said polyamide continuous phase, a hard HDPE core and satellites at the periphery made of the modified polyolefin having medium and soft domains that are discontinuous;
   and the inner or outer layer not comprised of said blend comprising PA 11 or PA 12.

2. The structure of claim 1 wherein the unmodified polyolefin(s) (b) do not contain metallocene polyethylenes.

3. The structure of claim 1 wherein the unmodified polyolefin comprises a high density polyethylene (HDPE), having a density of 0.930 or greater, and a flexural modulus of greater than 300 MPa.

4. The structure of claim 3, wherein said unmodified polyolefin has a density of 0.940 or greater and a flexural modulus of greater than 700 Mpa.

5. The structure of claim 1 wherein the modified polyolefin (c) comprises linear polyethylene.

6. The structure of claim 1 wherein said modified polyolefin (c) comprises as the soft domain a metallocene polyethylene with a density in the range of 0.865 to 0.915 and as the medium domain a non-metallocene polyethylene having a density of greater than 0.900.

7. The structure of claim 1 wherein said alloy comprises 60 to 90 percent by weight of polyamide.

8. The structure of claim 1 wherein said unmodified polyolefin comprises from 3 to 30 percent by weight of said alloy.

9. The structure of claim 1 wherein said object is a pipe, or hose or tubing.

10. The structure of claim 1, further comprising a tie layer or adhesive layer.

11. The structure of claim 1, wherein said object further comprises reinforcement.

12. The structure of claim 11 wherein said reinforcement comprises a reinforcing braid placed between the inner layer and the outer layer.

* * * * *